US005311272A

United States Patent [19]

Daniels et al.

[11] Patent Number: 5,311,272
[45] Date of Patent: May 10, 1994

[54] OPTICAL BUOYS FOR OCEANOGRAPHIC MEASUREMENTS BY IMAGING LIDAR

[75] Inventors: Kirk Daniels, Suffield, Conn.; R. Norris Keeler, McLean, Va.; Michael A. Cantor, Hartford, Conn.

[73] Assignee: Kaman Aerospace Corporation, Bloomfield, Conn.

[21] Appl. No.: 753,177

[22] Filed: Aug. 30, 1991

[51] Int. Cl.[5] .............................................. G01C 3/08
[52] U.S. Cl. ............................................. 356/5; 356/4
[58] Field of Search ................. 342/165, 167; 356/5, 356/4; 359/141, 515

[56] References Cited

U.S. PATENT DOCUMENTS

| | | | |
|---|---|---|---|
| 4,050,819 | 9/1977 | Lichtman | 356/5 |
| 4,203,108 | 5/1980 | Eknayan | 356/141 |
| 5,038,408 | 8/1991 | Titterton et al. | 359/141 |

Primary Examiner—Mark Hellner
Attorney, Agent, or Firm—Fishman, Dionne & Cantor

[57] ABSTRACT

Deployed, air dropped buoys are presented which can be used as calibrated targets for imaging lidar systems. In this way, oceanographic optical measurements can be made to determine in advance how an imaging lidar system will perform at the time of its deployment. This calibrated optical buoy is deployable from an airborne platform. The target is illuminated by an imaging lidar system and the target reflection is compared with the backscattering from the ocean volume illuminated. At the same time, measurements of light intensity are carried out to provide a direct measurement of the attenuation in the ocean. These data are taken at all depths and the results telemetered to the airborne lidar platform. In addition, a simplified embodiment is presented which uses the imaging lidar system to obtain both backscatter and attenuation. This simplified embodiment requires no telemetry.

41 Claims, 7 Drawing Sheets

OPTICAL BUOYS FOR OCEANOGRAPHIC MEASUREMENTS BY IMAGING LIDAR

BACKGROUND OF THE INVENTION

This invention relates generally to a sensor system for remote detection and imaging of objects submerged underwater and a deployable air dropped buoy for calibrating the sensor system. More particularly, this invention relates to a method and apparatus for calibrating an imaging light detection and ranging (lidar) system using a deployable optical buoy; and oceanographic measurements obtainable therefrom.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging.

An improved and novel system for remote detection and imaging of objects underwater (or objects obscured by other backscattering media which is at least partially transmitting to light such as ice, snow, fog, dust and smoke) from an airborne platform has been described in U.S. Patent Nos. 4,862,257 and 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging lidar system intended for night vision.

Imaging lidar systems of the type described hereinabove are also disclosed in commonly assigned U.S. Pat. Nos. 4,964,721 and 4,967,270, both of which are incorporated herein by reference. U.S. Pat. No. 4,964,721 relates to an imaging lidar system which controls camera gating based on input from the aircraft on-board altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

U.S. Ser. No. 565,631 filed Aug. 10, 1990 which is also assigned to the assignee hereof and fully incorporated herein by reference, relates to an airborne imaging lidar system which employs a plurality of pulsed laser transmitters, a plurality of gated and intensified array camera receivers, an optical scanner for increased field of regard, and a computer for system control, automatic target detection and display generation. U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

Still other imaging lidar systems are disclosed in U.S. Pat. Nos. 5,029,009 and 5,034,810, both of which are assigned to the assignee hereof and incorporated herein by reference.

While the imaging lidar systems described above are well suited for their intended purposes and are successfully utilized to detect various underwater and drifting obstructions, there is a need to obtain accurate calibration of the imaging lidar system, particularly when used from an airborne platform to view images below the water (typically ocean) surface. It will be appreciated that the variablities in sunlight, water properties, pollutants, and other factors significantly alter the optical properties of selected volumes of water. This variation in optical properties is also present with changes in depth. Presently, often inaccurate measurements and estimates of the optical properties of a given volume of water must be made when using an imaging lidar system. This may lead to undesirably inaccurate and inefficient imaging, target detection and target identification since the lidar settings may not be optimum for the water conditions actually present.

SUMMARY OF THE INVENTION

The above-described and other drawbacks and deficiencies of the prior art are overcome or alleviated by the present invention which affords a quick and efficient means of calibrating an imaging lidar system. In accordance with the present invention, an apparatus is provided which can be deployed from airborne and seaborne platforms and which can be used to predict and calibrate the performance of an imaging lidar system. More particularly, deployed, air dropped buoys are provided which can be used as calibrated targets for imaging lidar systems. In this way, oceanographic optical measurements can be made to determine in advance how an imaging lidar system will perform at the time of its deployment. This calibrated optical buoy is deployable from an airborne platform. The target is illuminated by an imaging lidar system and the target reflection is compared with backscattering from the ocean volume illuminated. At the same time, measurements of light intensity are carried out to provide a direct measurement of attenuation in the ocean. This data is taken at all depths and the results telemetered to the airborne lidar platform. The apparatus of this invention can thus be used to determine the attenuation and backscattering coefficient in the waters to be imaged by the lidar system by methods independent of and more accurate than that provided by the imaging lidar system itself.

In a preferred embodiment of the present invention, an apron deployed on a disposable air dropped chassis opens to provide a calibrated reflective surface and a detector which operates continuously during the descent of the dispensable buoy. Incident light energy is recorded by this calibrated optical buoy and transmitted upward to the monitoring airborne platform. Depth is determined by the associated lidar imaging system which can detect the optical buoy as it enters and exits a selected imaging gate, thereby providing a precise depth measurement.

The present invention is well suited for recording optical properties of the ocean over large areas by providing calibration for lidar imaging systems in operation. This technique of the present invention can be used to obtain significant oceanographic data over broad areas at high data rate and represents a significant improvement over prior art.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
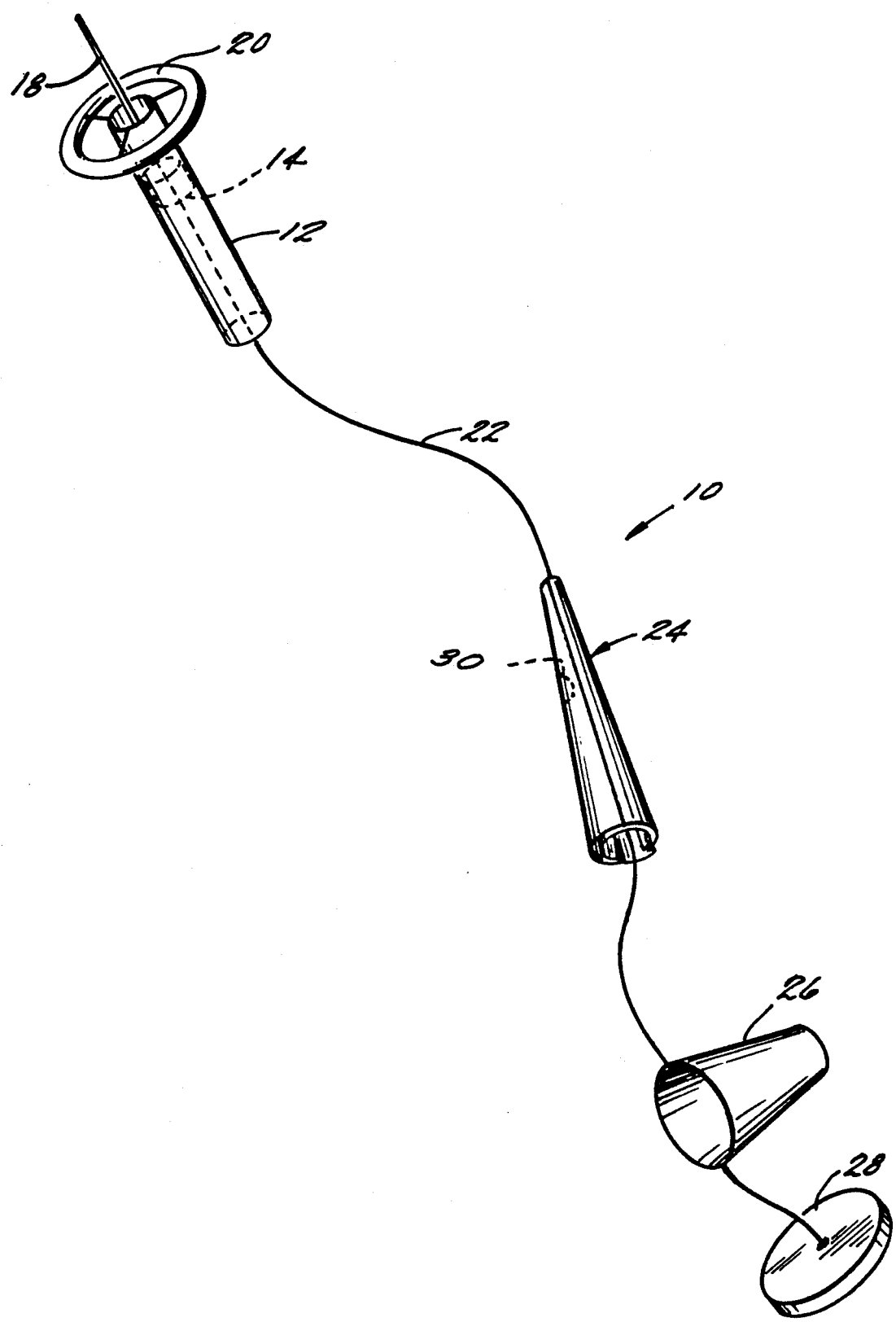
FIG. 1 is a perspective view of a calibrated optical buoy in accordance with the present invention.

Referring first to FIG. 1, a calibrated optical buoy in accordance with the present invention is shown generally at 10. Calibrated optical buoy 10 includes an RF transmitter chassis 12 with an RF transmitter 14. An antenna 18 and bright reflective inflatable collar 20 is attached to chassis 12. The "in water" portion of buoy 10 is down line from chassis 12 and suspended on a line 22, which is a suspension for a variable reflectivity disc 24, (which is shown in FIG. 1 in its folded configuration), a sea anchor 26 and a weight 28. Line 22 also functions as the transmission line for signals arriving from a detector 30, mounted on disc 24 (shown in its folded configuration).

Figure 2A:
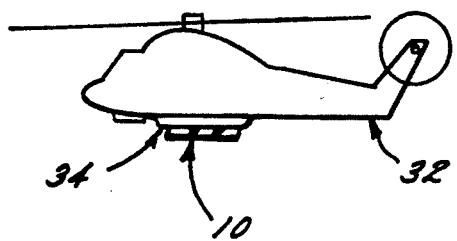
FIG. 2A is a side elevation view of a rotary wing aircraft prior to deployment of the calibrated optical buoy of FIG. 1.
Figure 2B:
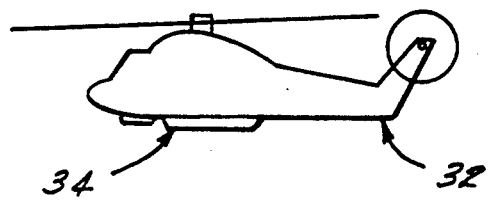
FIG. 2B is a side elevation view depicting the deployment of the calibrated optical buoy of FIG. 1 in the ocean.
Figure 2B:
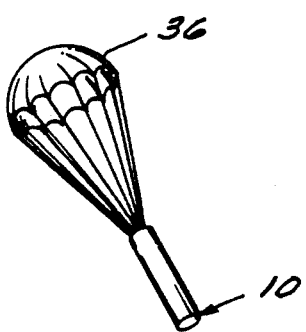
Figure 2B:
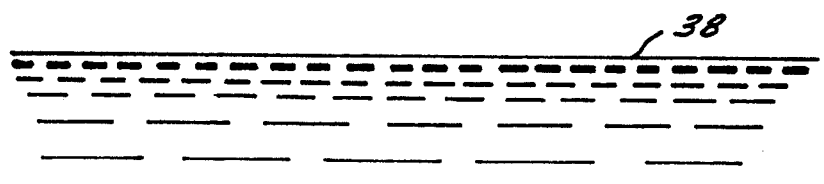

FIGS. 2A and 2B shows the deployment of the calibrated optical buoy 10 into the ocean. In FIG. 2A, the calibrated optical buoy 10 is mounted on an airborne platform 32 (e.g., rotary wing aircraft or helicopter) in known and previously present sonobuoy racks 34. Preferably, the calibrated optical buoy 10 is configured to be modular with standard sonobuoys currently in use. Thus, the calibrated optical buoy 10 can easily replace the sonobuoys presently stored in the racks 34. In FIG. 2B, the calibrated optical buoy 10 has been released from the platform 32 sonobuoy racks 34 and a drogue chute 36 has been deployed. The calibrated optical buoy 10 has been slowed by the drogue chute 36 and is preparing to enter the water 38. Upon entry, the various elements of calibrated optical buoy 10 shown in FIG. 1 are fully deployed and the fully opened disc 24, sea anchor 26 and weight 28 all begin to descend into the ocean at a predetermined rate as the line 22 unreels. This is shown in FIG. 3.

Figure 3:
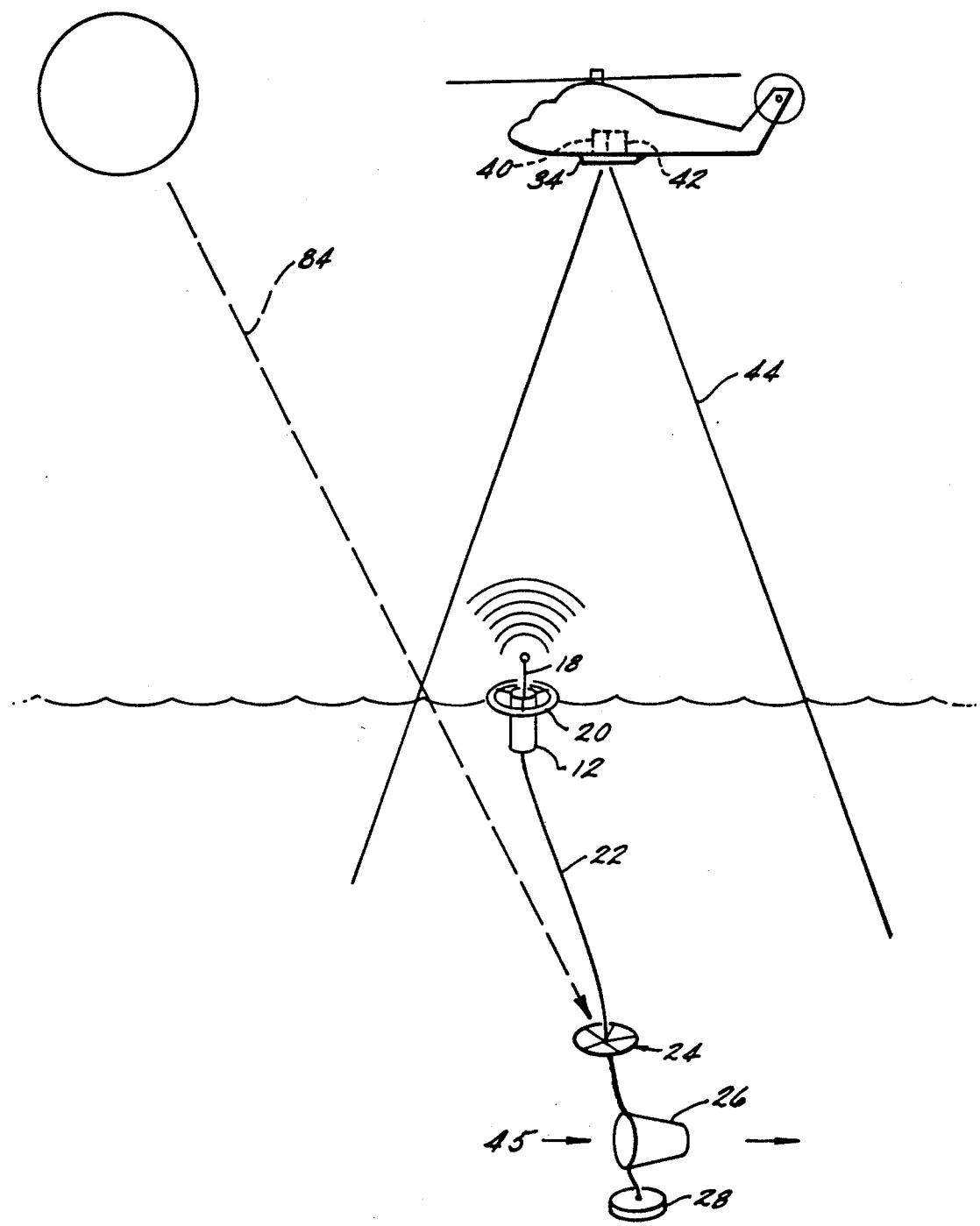
FIG. 3 is a diagrammatic view of an operating calibrated optical buoy in the ocean in accordance with the present invention.

Referring now to FIG. 3, calibrated optical buoy 10 is shown in its fully deployed configuration. The deployable disc 12 can exist in a number of embodiments. In a first embodiment shown in FIG. 8, disc 12 is stowed as two thin metallic or plastic bodies 100 of semicircular shape pivotably attached by pivots 102 along an axis and laid flat against the body of the optical buoy. A number of buoys can then be mounted in adjacent racks, with the disc semicircles mounted in parallel. The buoy is then deployed as shown in FIG. 3. The two semicircular discs are spring loaded, but do not open until the optical buoy enters the water.

A second embodiment is an "umbrella" configuration shown in FIG. 1 in which the disc is deployed upon entering the water. In this case, the disc is constructed of heavy but flexible plastic and has a slight negative conical chamber to provide stability. The "umbrella" disc is forced open by water pressure as it descends. Alternatively, the "umbrella" disc may be spring loaded.

A third embodiment is the use of segmented slats which lie parallel to the optobuoy in its stowed configuration but spread out to form a disc shortly after entry into the water.

Still referring to FIG. 3, platform 32 has released the calibrated optical buoy from the sonobuoy racks 34 and is irradiating the optical buoy with a laser transmitter 48 from an imaging lidar system of the type described above (e.g., U.S. Pat. Nos. 4,862,257; 4,964,721; 4,967,270; 5,013,917; 5,029,009; 5,034,810 or U.S. Ser. No. 565,631). Associated with laser transmitter 40 is gated camera receiver 42 for receiving light backscattered from the pulsed laser transmitter. Laser 40 projects its beam 44 downwardly to the ocean 38, illuminating the calibrated optical buoy assembly and in particular, the variable reflectivity disc 24 (which is shown in its fully open position). The whole assembly is stabilized by the sea anchor 26 and weight 28 in the ocean current 45. Disc 24 is then imaged by gated camera 42. The camera gate is set slightly above the top of the horizontally positioned disc 24, to insure that none of the pulse energy reflected from the disc is cut short by a gate too close to the top of the disc. For a 10 nsec pulse, 2-3 feet would be sufficient. Thus, the frame taken shows a surface of varying reflectivities and a volume of the ocean with close to a constant reflectivity. When the known and previously measured reflectivity of the disc and that of the ocean volume are equal, the boundary between the ocean and the disc will vanish. It will be appreciated that the gate width can be varied to change the volume reflectivity of the water.

Figure 4B:
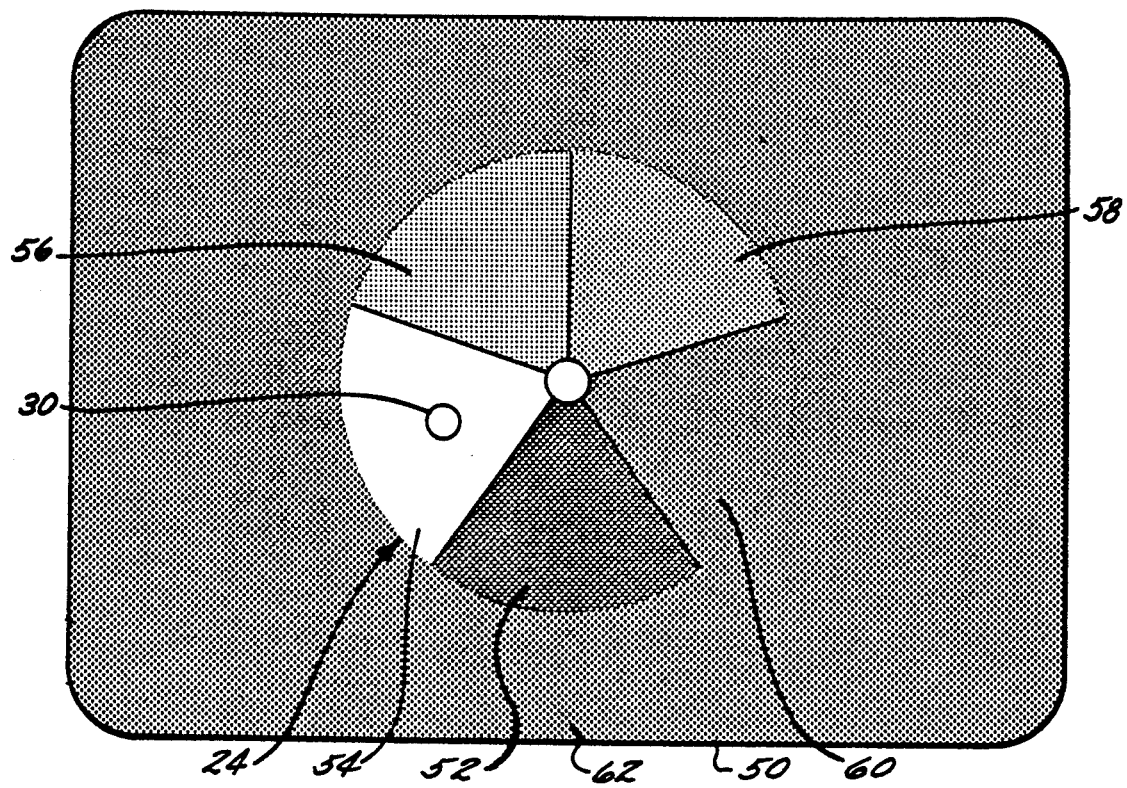
FIGS. 4A and 4B are respective perspective and plan views depicting direct measurement of the backscatter coefficient by lidar imaging on a variable reflectivity disc.
Figure 4A:
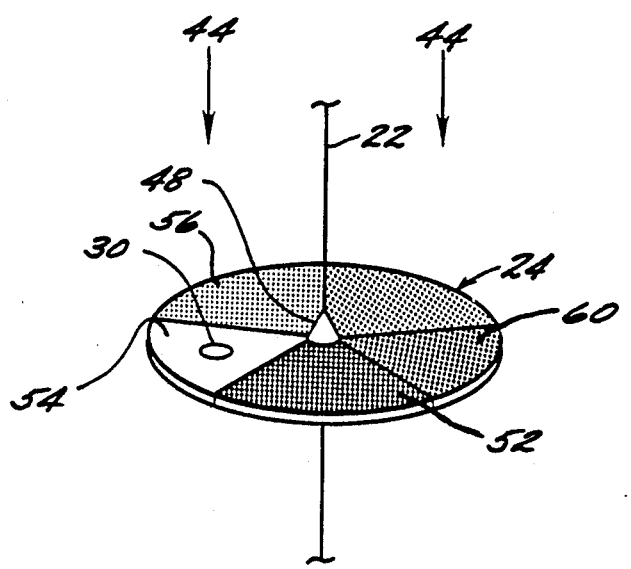

This situation is shown in FIGS. 4A and 4B. In FIG. 4A, disc 24 is shown suspended in the ocean and under illumination 44 from above. Regions of various reflectivity 46 from highly reflective to very low reflectivity are shown. The reflectivities are chosen so that at least one of them will approximate the volume reflectivity of the ocean volume imaged. The reflective surface must have the properties of a Lambertian reflector. Also shown are the suspending cable 22, the optical detector 30 and the horizontal suspension supports 48.

FIG. 4B shows the result of imaging the variable reflectivity disc. The frame 50 is shown as viewed in the platform by the console operator. The circular disc 24 has been imaged in a single frame and can be clearly seen. The region 52 appears darker than the surroundings and the reflectivity in that area is much less than the volume reflectivity of the ocean 38 as shown by the shade of ocean backscattered light 62 on the screen 50. Area 54 is very bright and reflects back the irradiating light much more strongly. Areas 56 and 58 are less strongly reflective so they also appear brighter than the ocean. Area 60 is an area where the paint chosen has almost exactly the same reflectivity as the volume reflectivity of the region 62 of the ocean imaged. There is no difference between the two areas 60 and 62. The interface between areas 60 and 62 has vanished (e.g., the two areas are indistinguishable). This provides an exact in situ measurement of the ocean's volume reflectivity from which performance of the lidar imaging system can be predicted.

Figure 5:
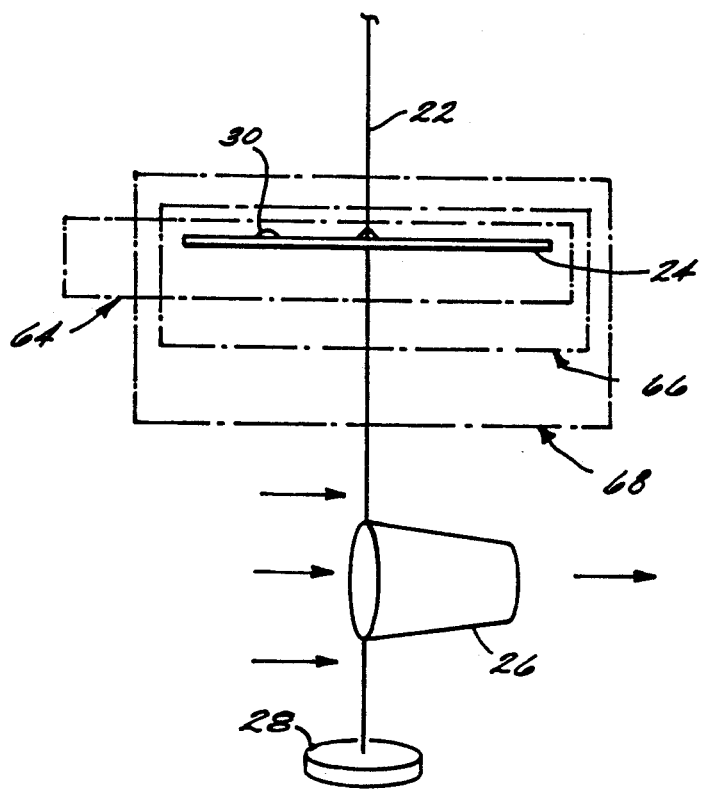
FIG. 5 is a side elevation view of a portion of the calibrated optical buoy of FIG. 1 depicting measurement of backscatter coefficient.

FIG. 5 shows the gating techniques used in obtaining the backscattering coefficient of the ocean to be imaged. The disc 24 is shown in profile. There are regions corresponding to three gates shown at 64, 66 and 68, each corresponding to a different volume imaged. The gates are offset for purpose of clarity, but in actual operation, they may be considered different "slices" of the same beam. If one assumes linearity of backscattering with length of gate (that is depth of region imaged), i.e.

| $B = b(z) = R$ (1) |
|---|
| where $b$ = backscattering coefficient; |
| $B$ = volume backscattering; |
| $z$ = depth below ocean surface; and |
| $R$ = Reflectivity of the disc. |

Then we may vary the volume reflectivity of the ocean by changing the depth of the volume images. The relationship between the backscattering coefficient b of the ocean and the reflectivity of the disc R when reflectivities match, is given by:

$$b = R/z \quad (2)$$

Therefore, the situation shown in FIG. 4B corresponds to imaging of illuminated volume 66, the "intermediate" gate width. If the gate width corresponding to illuminated volume 64 were used, the region 62 in FIG. 4B would be darker, matching more closely area 52 than 60. If the longer gate width corresponding to region 68 were used, the frame 50 would show a much greater backscattering from the ocean and the ocean background would match much more closely with areas 56 and 58. It is clear, however, that gates and disc reflectivities can be chosen so that highly accurate measurements of the backscattering coefficient can be made under all conditions and at all depths that imaging can be carried out. The backscattering from any differential volume slice is directly proportional to the light incident upon the slice. This light is attenuated exponentially with depth in the ocean according to the relationship $$I = I_0 e^{-kx} \quad (3)$$

which can be approximated by a linear relationship only at small values of x. In equation (3), I is the irradiance at a given depth x, $I_0$ is the surface irradiance (in W/m$^2$) of the light entering the water, k is the diffuse attenuation coefficient of the backscattering medium at the laser wavelength (also known as k factor), and x is the depth below the water surface. Thus, the equations cited previously are an approximation with limited application and are cited here only to facilitate understanding of the invention. The complete set of known equations governing the transport properties of light in the ocean should be applied.

It can be appreciated, however, that the quantities measured directly, (e.g., the volume backscatter and attenuation coefficient) relate directly to the performance of a lidar imaging system.

Figure 6:
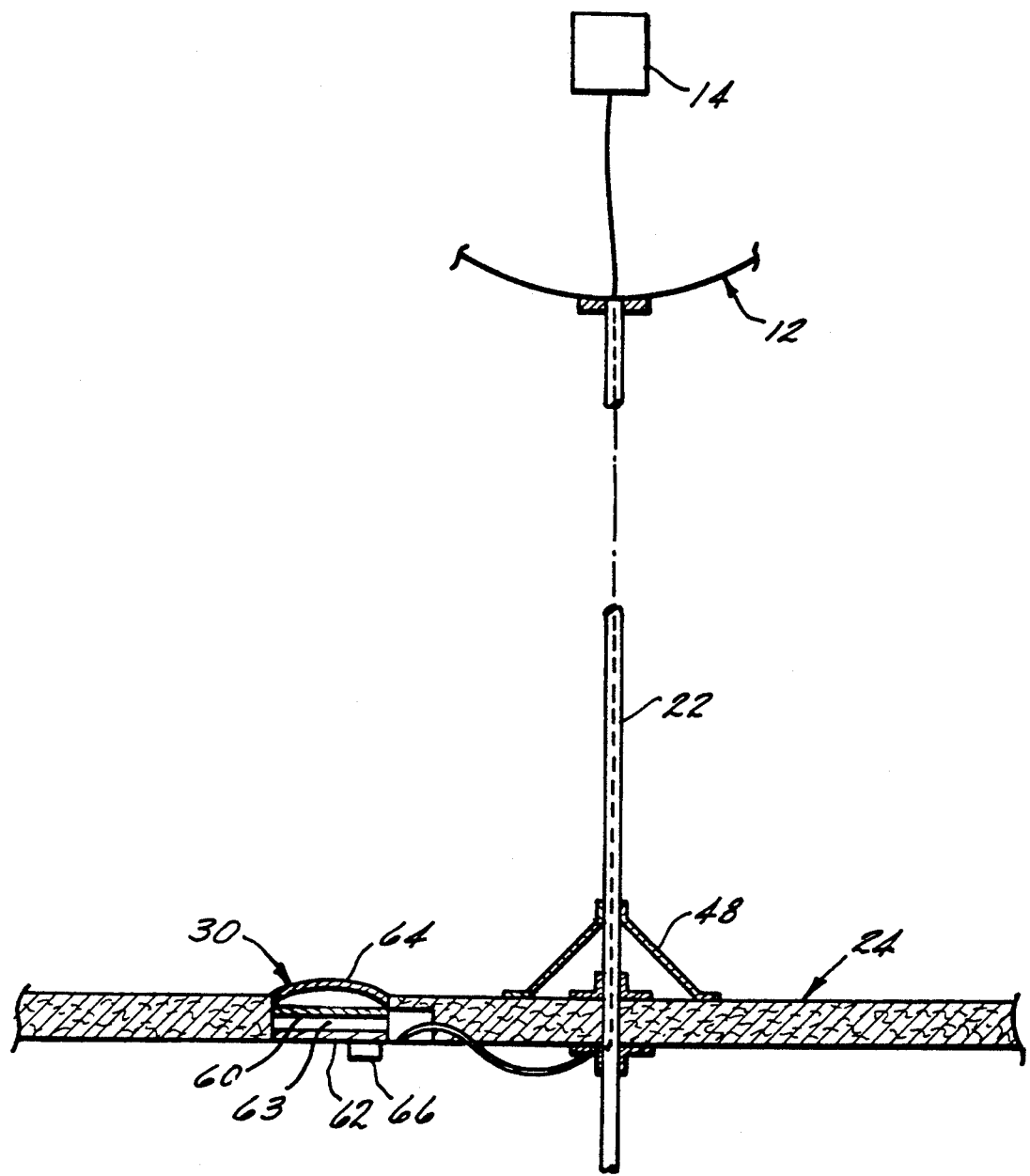
FIG. 6 is a side elevation view, partly in cross-section, of a portion of the calibrated optical buoy of FIG. 1, depicting direct measurement of light attenuation using the calibrated optical buoy of FIG. 1.

FIG. 6 is a schematic of the light intensity measuring device 30 which measures the intensity of the light at depth. Device 30 consists of a filter 60 and a detector 62 spaced from filter 60 by a hermetically sealed air space 63. The filter 60 is a narrow band filter of the dielectric type. A small acceptance angle is not desired, since the light returned from a Lambertian reflector can originate from light scattered out of the direct line of sight. An acceptance angle of approximately ±30° is desirable. The acceptance bandwidth can be as much as 20-30 nm, as the irradiating light will dominate the sunlight. Filter 60 is mounted within a pressure "bubble" 64. Detector 62 provides a signal to a logarithmic amplifier 66, which sends (via cable 22) the signal up to transmitter 14. This continuously transmits a "k" value up to the console operator, based on both sunlight attenuation of the irradiating pulses, as depth is increased.

Figure 7:
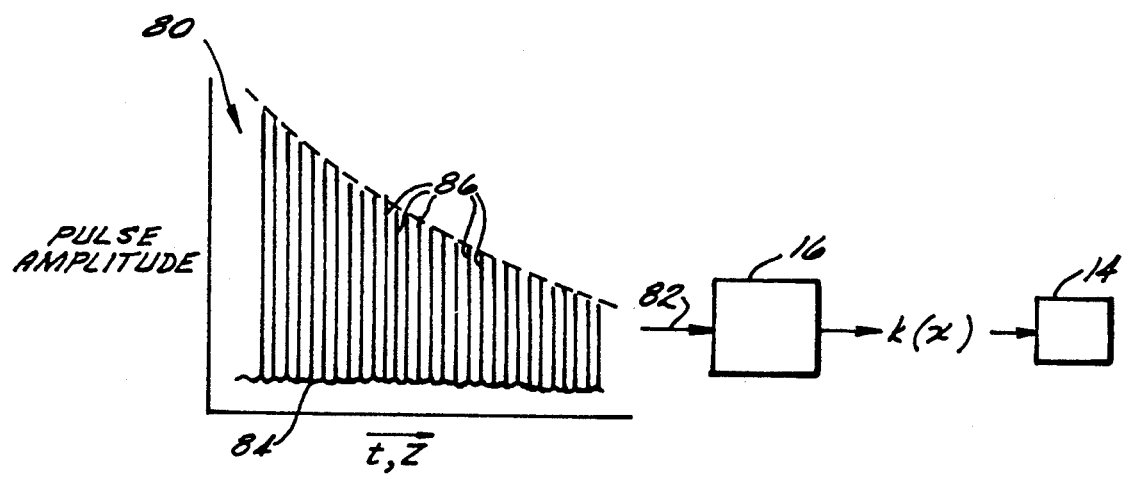
FIG. 7 is a schematic diagram depicting details of a light intensity measurement scheme using the calibrated optical buoy of FIG. 1.

FIG. 7 shows a schematic of the input 80 and output 82 signals as processed for transmittal by the transmitter 14. In the daylight, the sun's radiation 84 (e.g., solar noise) (see also FIG. 3) is shown against the pulses 86 from the transmitter. The output 82 is amplified by amplifier 66 for transmission by transmitter 14 and eventual transmittal to the operator in the platform 32.

While it is appreciated that precise measurements of light attenuation in the ocean can be made by use of the previously described embodiments, further simplification can be made by using the lidar imaging system to illuminate the brightest section 54 of the disc and observe the decrease of the light reflected from the disc as it descends deeper into the ocean. The lidar equation for this situation is $$I = I_0 \exp(-2kx) \quad (4)$$

It will be appreciated that Equation 4 is simplified and does not show correction for interface losses, beam spreading, finite target size, etc., but computer programs are available which do account for these effects. The appropriate coefficients can be entered at the operator's console and used in a subroutine for a more detailed and accurate relationship.

Figure 8:
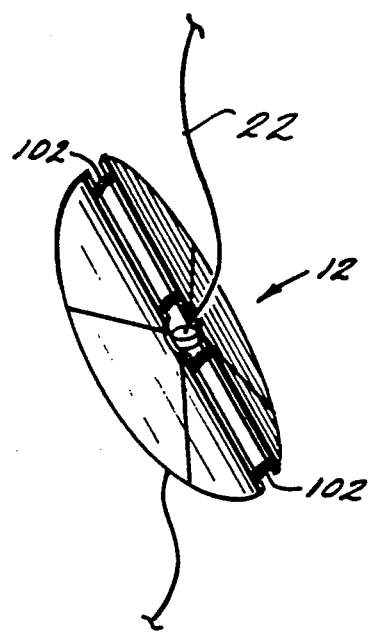
FIG. 8 is a perspective view of an embodiment of a reflectivity disc in accordance with the present invention.
Figure 9:
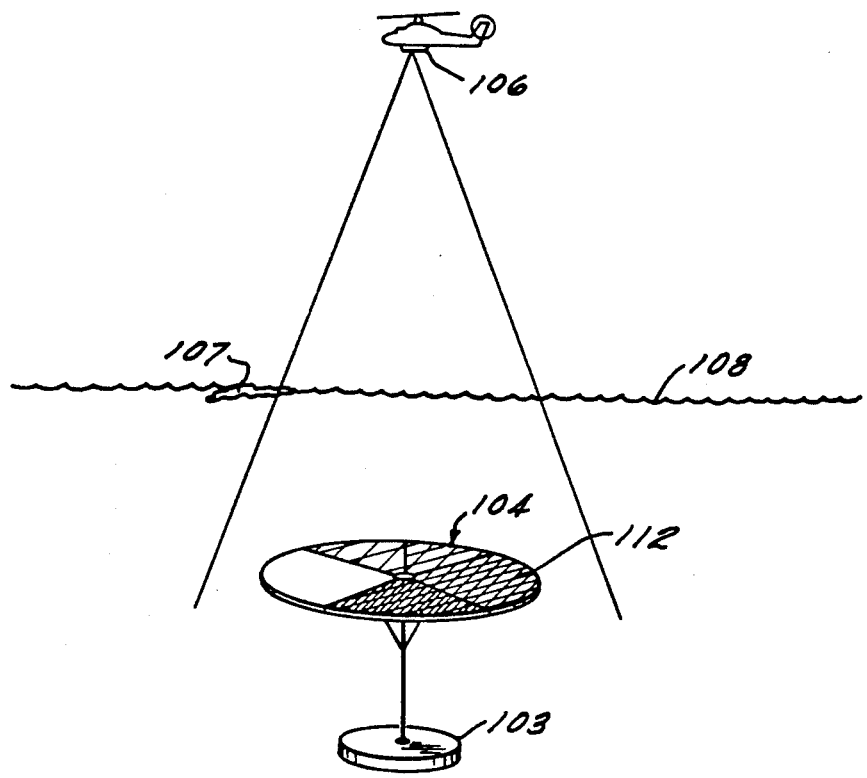
FIG. 9 is a side elevation view depicting an alternative embodiment of the present invention.

It can easily be seen that in this embodiment, no antenna, float, transmission line, amplifer, detector filter and sea anchor are required. Only the foldable disc and its stabilizing elements (e.g., ballast) are needed. The disc in this embodiment is deployed as shown in FIGS. 1, 8 and 9. In FIG. 9, the disc 104 has been released from the platform 106, the drogue parachute 107 has been released, the disc has entered the ocean 108 and is descending at a rate of a few feet per second under the weight of a ballast 103. The lidar imaging system 110 has been activated and holds the disc in its field of view. As described in FIGS. 4A and 4B, the various sections of the disc are in view and the ocean backscatter is measured directly. As the disc descends, only the brightest painted section 112 remains visible. By isolating its geometric boundary in the images produced in the imaging lidar camera and recording the decrease is light reflected as depth increases, both a differential and discrete value of "k" can be inferred.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An optical buoy for oceanographic measurements by an imaging lidar system comprising:
   calibrated reflective surface means, said reflective surface means including a plurality of regions having different known and preselected reflectivities; and
   weight means for retaining said reflective surface means beneath the water.

2. The optical buoy of claim 1 wherein:
   said reflective surface means comprises a disc.

3. The optical buoy of claim 2 wherein:
   said disc is circular with said regions comprising a radial section of said disc.

4. The optical buoy of claim 1 wherein:
   said reflective surface means is movable between a closed position and an open position.

5. The optical buoy of claim 1 including:
   light intensity measurement means associated with said reflective surface means.

6. The optical buoy of claim 5 including:
   transmitter means communicating with said light intensity measurement means.

7. The optical buoy of claim 5 wherein said light intensity measurement means comprises:
   filter means;
   detector means spaced from and in optical communication with said filter means.

8. The optical buoy of claim 5 including:
   amplifier means communicating with said light intensity measurement means for amplifying signals from said light intensity measurement means.

9. The optical buoy of claim 1 including a platform positioned above the water and further including:
   imaging lidar sensor means positioned on said platform, said imaging lidar sensor means imaging said calibrated reflective surface means.

10. The apparatus of claim 9 wherein:
    said platform comprises an airborne platform.

11. The apparatus of claim 10 wherein:
    said airborne platform comprises a rotary wing aircraft.

12. The apparatus of claim 9 wherein said imaging lidar means comprises:
    means for selectively generating short pulses of light using transmitter means;
    means for projecting said short pulses of light toward water and at said calibrated reflective surface means disposed in a target volume at least partially enveloped by the water;
    gated camera means for receiving said pulses of light reflected back from said target volume after a time delay corresponding to the round-trip propagation time of said light pulses to and from said target volume; and
    means for converting said received pulses of light to a video image of said calibrated reflective surface means.

13. The apparatus of claim 1 including:
    floatation means operatively connected to said calibrated reflective surface means.

14. The apparatus of claim 1 including:
    stabilization means for stabilizing said calibrated reflective surface means beneath the water.

15. A system for making oceanographic measurements comprising:
    imaging lidar sensor means adapted for positioning on a platform above a body of water; and
    optical buoy means deployable into the body of water, said optical buoy means including calibrating means for calibrating said imaging lidar sensor means when said optical buoy means has been deployed into the body of water.

16. The system of claim 15 wherein said calibrating means comprises:
    calibrated reflective surface means including a plurality of regions having different reflectivities.

17. The system of claim 16 wherein said optical buoy further includes:
    floatation means operatively connected to said calibrating means; and
    weight means for retaining said calibrating means beneath the water.

18. The system of claim 16 wherein:
    said reflective surface means comprises a disc.

19. The system of claim 18 wherein:
    said disc is circular with said regions comprising a radial section of said disc.

20. The system of claim 16 wherein:
    said reflective surface means is movable between a closed position and an open position.

21. The system of claim 16 including:
    light intensity measurement means associated with said reflective surface means.

22. The system of claim 21 including:
    transmitter means communicating with said light intensity measurement means.

23. The system of claim 21 wherein said light intensity measurement means comprises:
    filter means;
    detector means spaced from and in optical communication with said filter means.

24. The system of claim 21 including:
    amplifier means communicating with said light intensity measurement means for amplifying signals from said light intensity measurement means.

25. A method of calibrating an imaging lidar system comprising the steps of:
- releasing an optical buoy into a body of water from a platform, the optical buoy including calibrating means for calibrating an imaging lidar system;
- using an imaging lidar system positioned on said platform to obtain an image of said calibrating means; and
- calibrating the imaging lidar system based on image input of said calibrating means.

26. The method of claim 25 wherein said calibrating means comprises:
- calibrated reflective surface means including a plurality of regions having different reflectivities.

27. The method of claim 26 wherein said optical buoy further includes:
- floatation means operatively connected to said calibrating means; and
- weight means for retaining said calibrating means beneath the water.

28. The method of claim 26 wherein:
said reflective surface means comprises a disc.

29. The method of claim 28 wherein:
said disc is circular with said regions comprising a radial section of said disc.

30. The method of claim 26 wherein:
said reflective surface means is movable between a closed position and an open position.

31. The method of claim 26 including:
light intensity measurement means associated with said reflective surface means.

32. The optical buoy of claim 31 including:
transmitter means communicating with said light intensity measurement means.

33. The method of claim 31 wherein said light intensity means comprises:
filter means;
detector means spaced from and in optical communication with said filter means.

34. The method of claim 31 including:
amplifier means communicating with said light intensity measurement means for amplifying signals from said light intensity measurement means.

35. An optical buoy for oceanographic measurements by an imaging lidar system comprising:
- calibrated reflective surface means, said reflective surface mans including a plurality of regions having different reflectivities and said reflective surface means comprising a disc; and
- weight means for retaining said reflective surface means beneath the water.

36. The optical buoy of claim 35 wherein:
said disc is circular with said regions comprising a radial section of said disc.

37. The optical buoy of claim 35 wherein:
said plurality of regions have different known and preselected reflectivities.

38. An optical buoy for oceanographic measurements by an imaging lidar system comprising:
- calibrated reflective surface means, said reflective surface means including a plurality of regions having different reflectivities, said reflective surface means being movable between a closed position and an open position; and
- weight means for retaining said reflective surface means beneath the water.

39. The optical buoy of claim 38 wherein:
said plurality of regions have different known and preselected reflectivities.

40. The system of claim 16 wherein:
said plurality of regions have different known and preselected reflectivities.

41. The system of claim 26 wherein:
said plurality of regions have different known and preselected reflectivities.

* * * * *